United States Patent
Breitbach et al.

[11] Patent Number: 5,735,374
[45] Date of Patent: Apr. 7, 1998

[54] CURRENT COLLECTOR FOR TRANSMITTING ENERGY BETWEEN A CONTACT WIRE AND A MOTOR COACH

[75] Inventors: Elmar Breitbach, Göttingen; Andreas Büter, Braunschweig, both of Germany

[73] Assignee: Deutsche Forschungsanstalt fur Luftund Raumfahrt e.V., Bonn, Germany

[21] Appl. No.: 742,921

[22] Filed: Nov. 1, 1996

[30] Foreign Application Priority Data

Nov. 3, 1995 [DE] Germany ............ 195 40 914.0

[51] Int. Cl.$^6$ ............................................. B60L 5/04
[52] U.S. Cl. ....................... 191/54; 191/65; 191/66
[58] Field of Search ........................ 191/50, 54, 55, 191/64, 65, 66, 67, 68, 70

[56] References Cited

U.S. PATENT DOCUMENTS

| | | | |
|---|---|---|---|
| 2,935,576 | 5/1960 | Faiveley | 191/68 |
| 3,576,957 | 5/1971 | Tustin | 191/60.3 |
| 4,385,434 | 5/1983 | Zehnpfennig et al. | 29/281.1 |
| 5,115,405 | 5/1992 | Cathala et al. | 191/60.3 |
| 5,217,037 | 6/1993 | Bristol | 137/14 |

OTHER PUBLICATIONS

Aktive Stromabnehmer bei Hockgeschwindigkeitszugen, Daniel Huber, eb–Elektische bahnen 91(1993), 8 pages.

Hockgeschwindigkeits–Stromabnehmer fur den ICE, eb–Elektische Bahnen 89 (1991), 6 pages.

Anwendung von Piezotranslatoren im Werkzeugmaschinen bau, Antriebstechnik VDI-Z 130 (1988), Nr. 6 – Juni 7 pages.

Power plus Prazision, Lothar Lauer, Aktoren, elektrotechnik, 74, H.9, 24 Sep. 1992, 5 pages.

Piezoelektrische aktoren, Mikroperipherik, me Bd. 4 (1990) Heft 6, 4 pages.

*Primary Examiner*—S. Joseph Morano
*Attorney, Agent, or Firm*—Isaf, Vaughan & Kerr; Charles H. Fails

[57] ABSTRACT

A current collector (15) is provided for transmitting energy between a contact wire (2) and a motor coach. The current collector comprises at least one collector shoe (1) and a support arm (11) constructed and arranged to lift the collector shoe, and to apply a contact force in which the collector shoe lies below and against the contact wire. The support arm is rotatably connected to the motor coach about a horizontal axis (17) and raiseable about the axis by a lifting device (3). The lifting device includes a fast actuator (23) which is constructed and arranged to be controlled by a control device (22) in dependence on a signal (20, 21) of at least one displacement sensor, force sensor (18), or acceleration sensor (19) located on the current collector to maintain the contact force of the collector shoe against the contact wire.

8 Claims, 2 Drawing Sheets

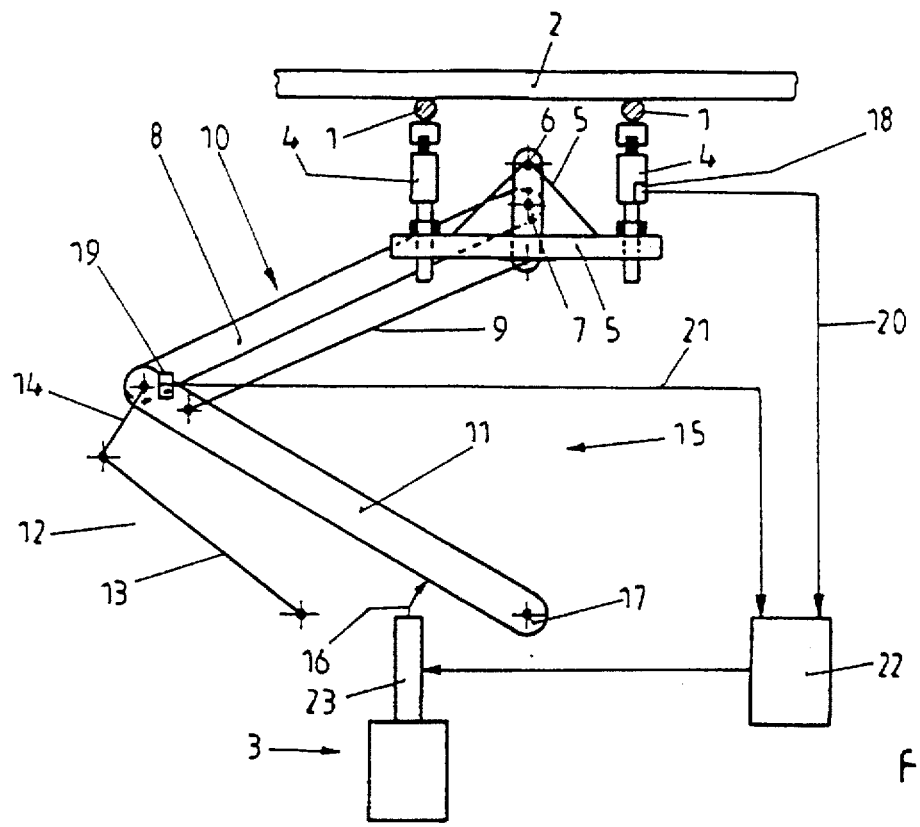
Fig. 1
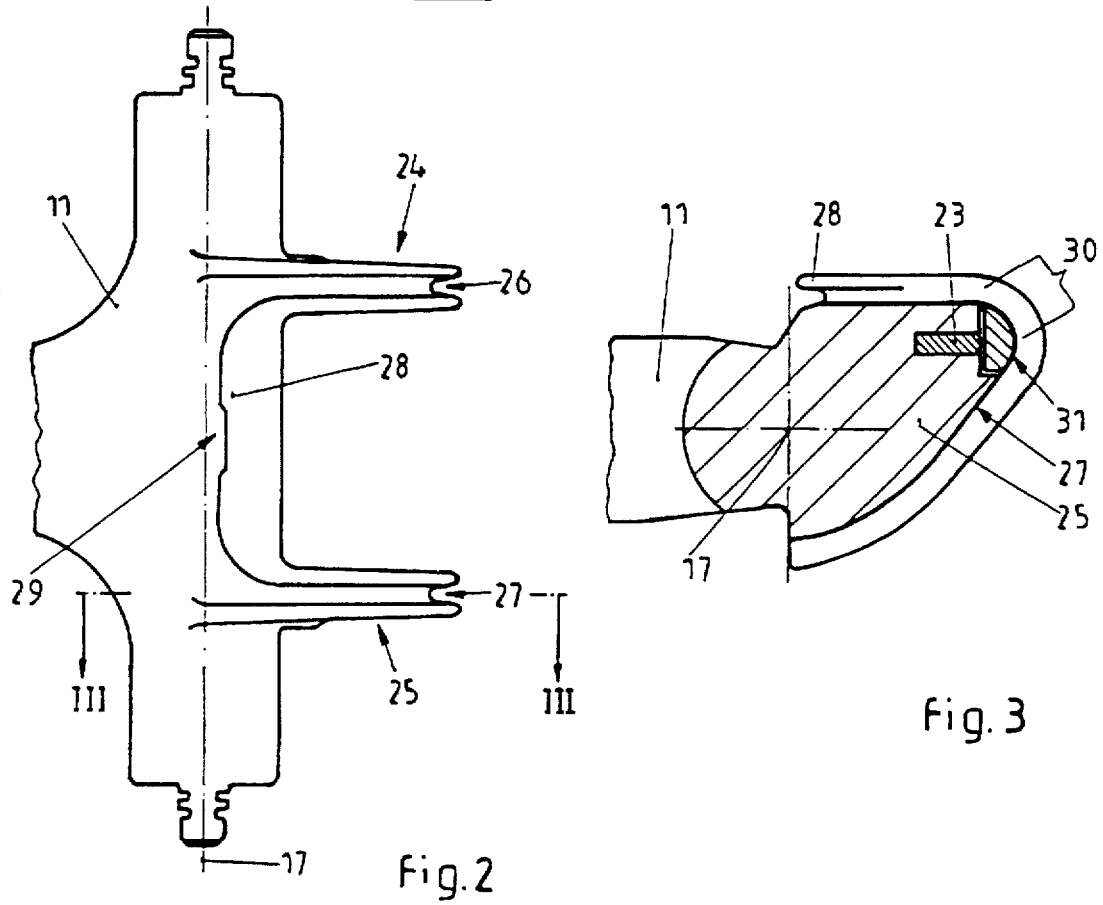
Fig. 2
Fig. 3

CURRENT COLLECTOR FOR TRANSMITTING ENERGY BETWEEN A CONTACT WIRE AND A MOTOR COACH

FIELD OF THE INVENTION

The invention relates in general to a current collector for transmitting energy between a contact wire and a motor coach. More particularly, the invention relates to a current collector, the current collector comprising at least one collector shoe and a support arm for lifting the collector shoe and for applying a contact force with which the collector shoe lies from below against the contact wire in transmitting energy, the support arm being connected to the motor coach rotatably about a horizontal axis and being raisable about said axis by a lifting device. Such current collectors are used with rail vehicles. The invention particularly relates to current collectors for very fast rail vehicles.

BACKGROUND OF THE INVENTION

A Current collector of the type described at the beginning is known from the article "406, 9 km/h—Weltrekord auf der Schiene—Energieübertragung bei der Rekordfahrt des ICE der DB", elektrische Bahnen eb, Vol. 86, No. 9/1988, pages 268 to 289. The current collector SSS 87 which is described there comprises a rocker on which two collector shoes are each supported via two spring-loaded legs located at their ends. The rocker is connected to an upper pantograph tilting about a horizontal axis, the upper pantograph being a four-bar chain. This four-bar chain is coupled with a further four-bar chain called lower pantograph in such a way that in raising a support arm, which is connected to the motor coach rotatably about a horizontal axis and which forms a part of the lower pantograph, the whole current collector is raised and guides the rocker with the collector shoes parallel upwards, until the collector shoes are pressed against the contact wire with a predetermined contact force. The lifting device of the known current collector has a pneumatic actuation element which acts upon the support arm via a traction rope. In dependence on its support, the contact wire is lifted upwards by the contact force applied by actuation element. The support of the contact wire is achieved by a contact wire suspension. Therein, the stiffness of the support of the contact wire varies over its longitudinal extension. Within the points of support of the contact wire suspension the stiffness of the support is maximum, between the points of support it is minimum. Correspondingly, the contact wire is lifted by the collector shoes to a minimum within the points of support and to a maximum between the points of support. This means, if the height of the rocker above the motor coach is constant, that the spring-loaded legs partially relax between the points of support, whereby the contact force of the collector shoes against the contact wire varies over the longitudinal extension of the contact wire. These variation of the contact force effects dynamic excitations of the contact wire as well as of the contact wire suspension connected downstream of the contact wire, and of the collector shoes as well as of the current collector connected downstream of the collector shoes. These dynamic excitations lead to an increase of the variation of the contact force of the collector shoes against the contact wire. Apart from this, the contact force of the collector shoes against the contact wire is varied by dynamic influences of the relative wind blowing against the current collector. It is possible to compensate said dynamic influences by means of wind deflector plates. However, such wind deflector plates have different effects in a tunnel and on the open line. Additionally, relevant peaks of the contact force may occur during tunnel entry and tunnel exit due to the wind deflector plates. The varying lifting of the contact wire by the collector shoes can be reduced in that the stiffness of the support of the contact wire suspension is increased. Herein however, the contact wire and the contact wire suspension are put under a lot of stress as relevant effects on the stiffness of the support can only be achieved by considerable tension forces.

It is the problem of the invention to disclose a current collector of the type described at the beginning by means of which it is possible to keep constant to a far extent the contact force of the collector shoe against the contact wire even under varying conditions of operation of the current collector.

SUMMARY OF THE INVENTION

According to the invention this problem is solved in that the lifting device is associated with a fast actuator which is controlled by a control means in dependence on the signal of at least one displacement, force or acceleration sensor located on the current collector in such a way that the contact force of the collector shoe against the contact wire is kept constant. The lifting devices of known current collectors normally comprise a hydraulically or pneumatically operated lifting cylinder as an actuation element. In the new current collector the fast actuator is connected in series to this actuation element. Here, fast means that the actuator is able to apply different forces to the support arm very fast as compared with a hydraulic or pneumatic actuation element. The forces which the actuator presently applies to the support arm are established by the control means in dependence on the signal of the displacement, force or acceleration sensor located on the current collector. In this, the control means can be adaptive so that it adapts also itself to the present operating status of the current collector. Such adaptive control means are, for example, known from DLR-publication "Adaptive Structures—Concepts and Prospects". There, adaptive control means are described as means for the reduction of vibrations in elastic dynamic systems. In the present concrete application of the control means, it is the object to keep constant the contact force of the collector shoe against the contact wire. To this end a signal is required as an input signal for the adaptive control means which is correlated with the disturbing influences on the contact force explained above. Such a signal is to be recorded at the current collector itself. The influence of the sensor necessary for that on the dynamic behaviour of the current collector is negligible. This is also valid with regard to the actuator which is arranged in the region of the lifting device. Due to this kind of arrangement, the support arm acts as an increasing lever arm with regard to the influences of the actuator, in turn, the actuator takes only part in the dynamic behaviour of the current collector at a decreased level. Particularly, the actuator is of no relevant account for the inert or vibrating masses of the current collector. With a suitable tuning of the control means all above-mentioned influences on the contact force of the collector shoe can, in operation of the new current collector, be compensated individually, if they can be registered separately, and, particularly, in total, i.e., the support arm is raised by means of the actuator to a variable extent to compensate the varying lifting of the contact wire to compensate dynamic influences on the contact wire and to neutralize aerodynamic forces with regard to their effect on the contact force.

Suitable fast actuators for the new current collector are particularly piezoelectric and magnetostrictive actuators.

Besides, electrostrictive ceramics as well as structure-changing alloys and polymers and suchlike are known, from which actuators can also be made which can principally be used in the new current collector. However particularly, piezoelectric actuators are freely available in such embodiments that are also advantageously used with the new current collector.

It is known with current collectors that the lifting device acts upon the support arm via a traction rope. The traction rope is, for example, tensioned by the pneumatic or hydraulic actuation elements already mentioned above. If such a traction rope is provided, the actuator of the new current collector acts upon the traction rope.

The actuator can be arranged in the direction of the traction rope, i.e. in parallel with the traction rope. Thus the force applied by the actuator has directly the same effect as an increase of the tension force of the traction rope.

Contrarily, a relevant increasing of the force results from the actuator being arranged perpendicularly to the traction rope at a distance from the fixed points of the traction rope. However, with this reducing gear the actuator is not suitable for compensating greater displacements. Instead, the actuator is essentially restricted to the compensation of forces.

If a traction rope is provided for raising the support arm, a guideway for the traction rope is normally formed at the support arm, the operative radius of which between the tangent line of the traction rope and the axis about which the support arm is raised defines the lever arm of the lifting device in raising the support arm. Particularly, the lever arm is tuned in such a way that it is comparatively short in the beginning of raising the support arm, and that it is comparatively long in applying the contact force of the collector shoes against the contact wire. The actuator of the new current collector can indirectly act upon the traction rope in that it changes the operative radius of the guideway. Therein, it changes the lever arm of the lifting device and therein in turn, the transmission ratio between the tension of the traction rope and the contact force of the collector shoes against the contact wire. It is appreciated, that the actuator has to affect the operative radius of the guideway in that region of the guideway which corresponds to the application of the contact force of the collector shoes against the contact wire.

The known piezoelectric and magnetostrictive actuators are comparatively tension sensitive. But they can at the same time be loaded with very high pressures. Correspondingly, it is preferred that the actuator is arranged in such a way that it is loaded with pressure by the tensile stress in the traction rope. This means that the actuator only has an influence on the tensile force, if the actuator has overcome the pre-stress due to the tensile force.

Preferably, the signal of the force or acceleration sensor at the current collector is directly a measure of the contact force between the collector shoe and the contact wire. To this end, a force or acceleration sensor can be arranged directly below the collector shoe. In modifying the known current collector having the two four-bar chains, a displacement, force or acceleration sensor can also be located in the region of the coupling of the two four-bar chains. Here also, it is possible to obtain a measure of the contact force of the collector shoe against the contact wire. At the same time however, dynamic excitations of the current collector which have no direct effect on the contact force can also be measured here.

In the following, the invention is explained and described by means of embodiment examples.

BRIEF DESCRIPTION OF THE DRAWINGS

FIG. 1 shows the current collector in a side view,

FIG. 2 shows the end region on the motor coach side of the support arm of the current collector according to FIG. 1, FIG. 3 shows a first possibility of arranging an actuator in the current collector according to FIGS. 1 and 2.

DETAILED DESCRIPTION

Figure 4:
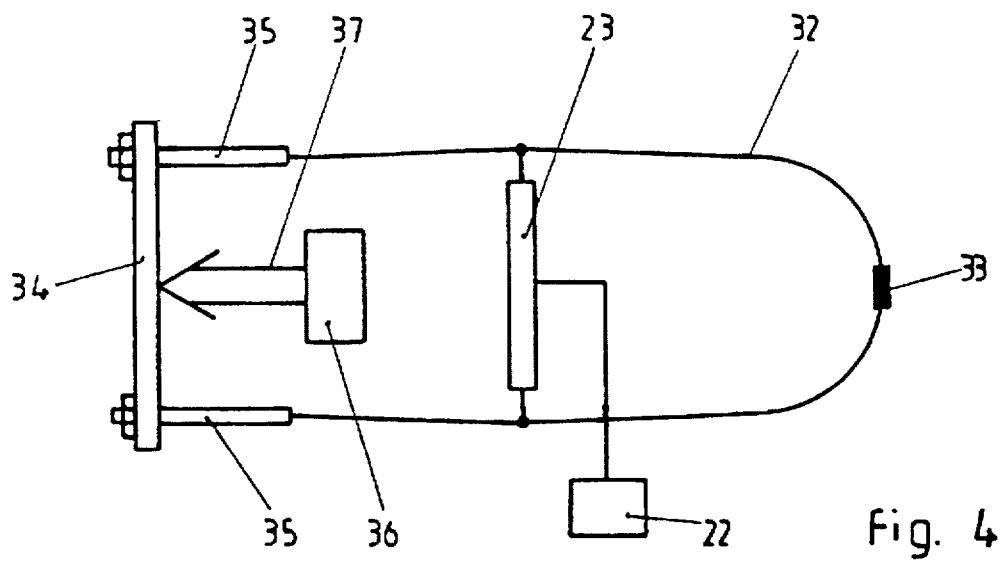
FIG. 4 shows a second possibility of arranging an actuator in the current collector according to FIGS. 1 and 2.

The current collector 15 depicted in FIG. 1 comprises two collector shoes 1. In the operation of the current collector 15 the collector shoes 1 are lifted until they lie from below against a contact wire 2 with a predetermined contact force. Via spring-loaded legs 4, the collector shoes 1 are supported on a rocker 5 which is connected to a supporting piece 7 tilting about a horizontal axis 6. The supporting piece 7 is a part of a four-bar chain which is called upper pantograph 10. Besides the supporting piece 7, a support arm 8, a guide bar 9 as well as an upper section of a further support arm 11 belong to the upper pantograph 10. The support arm 11 is also a part of a further four-bar chain which is called lower pantograph 12. Besides the support arm 11, a guide bar 13, an extension element 14 rigidly connected with the support arm 8, and the motor coach, not diagrammatically shown here, on which the current collector 15 is arranged belong to the lower pantograph 12. Relative to the motor coach, the support arm 11 can be raised by a lifting device 3 in direction of an arrow 16 about an axis 17. Therein, the rocker 5 is lifted in parallel directions, and after the collector shoes 1 lie against the contact wire 2, a contact force is applied between the collector shoes 1 and the contact wire 2. As a result, the contact wire 2 is lifted in dependence on the stiffness of its support. Therein, the contact force is supervised by a force sensor 18 and/or an acceleration sensor 19 in the region of the support of the collector shoes 1 or of the coupling of the lower pantograph and the upper pantograph 10, respectively. The signal 20 or 21, respectively, of this force sensor 18 or acceleration sensor 19, respectively, is supplied to a control means 22. The control means 22 controls an actuator 23. The actuator 23 is a part of the lifting device 3. However, it is not provided for actually raising the support arm 11 about the axis 17. To this end, other actuation elements are provided.

Instead, the actuator 23 is used to apply a force to the support arm 11 in direction of the arrow 16 in addition to these actuation elements to compensate the influences on the contact force of the collector shoes 1 against the contact wire 2 fast, i.e. faster than it would be possible with the actual actuation elements of the lifting device 3. To this end, the control means 22 is adaptive to adapt also itself to the present operating status of the current collector 15. In particular, it is able to process signals 20 and 21 of higher frequencies and to control the actuator 23 accordingly. Normally, the actuator is such a piezoelectric actuator that is commercially available. However, magnetostrictive and other fast actuators can also be used.

FIG. 2 shows the lower end of the support arm 11 on the motor coach side. Here, the support arm 11 comprises two cam type extensions 24 and 25 on which guideways 26 and 27 for a loop-shaped traction rope, not depicted in FIGS. 1 and 2, are formed. A hook 28 for encompassing the traction rope is located between the guideways 26 and 27. The hook 28 is used for fastening the loop-shaped traction rope at the support arm 11, an recess 29 being provided for receiving a guide piece placed upon the loop-shaped traction rope.

FIG. 3 shows a cross section through the support arm 11 in the region of the guideway 27. The guideway defines the lever arm by which the tensile force of the traction rope acts upon the support arm 11. The guideway 27 establishes the radius which defines the torque about the axis 17 due to the tensile force of the traction rope. This radius is the distance between the tangent line of the guideway or the traction rope winding on the guideway, respectively, and the axis 17. In a region 30, this operative radius is maximum. The region 30 corresponds to the raised position of the support arm 11 which is depicted in FIG. 1 and in which the contact force for the collector shoes 1 against the contact wire 2 is applied. In the region 30 of the guideway 27, the course of the guideway 27, i.e. its operative radius, can be changed by means of the actuator 23. Therein, the actuator 23 increases the distance of a part 31 of the guideway 27 to the axis 17. Herein, the torque applied to the support arm 11 by the tensile force of the traction rope is directly changed.

FIG. 4 shows the loop-shaped traction rope 32 which is guided by the guideways 26 and 27 on the support arm 11 and held by the hook 28. Therein, the guiding piece 33 engages in the recess 29 in the hook 28. The traction rope 32 is a high capacity wire rope. The free ends of the traction rope 32 are fastened to a retaining plate 34 via screwed fastening bushes 35. The retaining plate 34 is loaded with a force indicated by an arrow 37 by an actuation element 36 of the lifting device. This force 37 leads to a tensile stress in the traction rope 32 from which the torque for raising the support arm 11 about axis 17 (FIG. 3) results. The actuator 23 acts perpendicularly upon the traction rope 32 and is therein arranged at a distance to the fixed points of the traction rope. In this way, a decreasing gear for the actuator 23 is formed, i.e., the actuator is provided for applying great additional forces to the traction rope 32. Therein however, it is impossible to cover greater displacements of the traction rope 32 or greater differences in the raising angle of the support arm 11, respectively, by means of the actuator 23.

Figure 5:
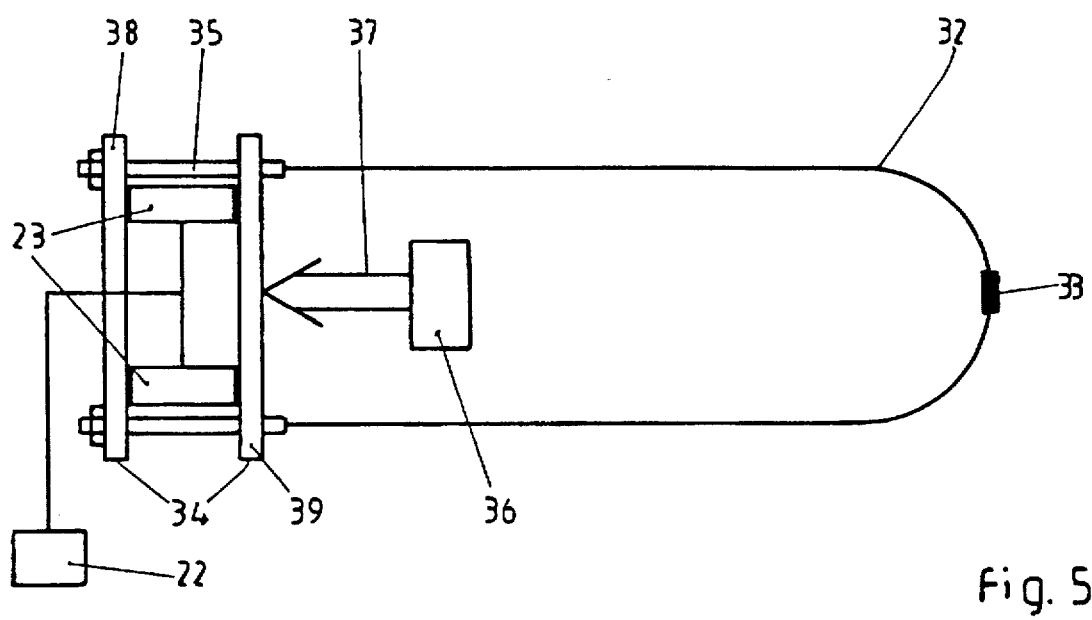
FIG. 5 shows a third possibility of arranging an actuator in the current collector according to FIGS. 1 and 2.

FIG. 5 shows an alternative arrangement of the actuator 23. There, the retaining plate 34 is of two-part construction. The free ends of the traction rope 32 are fastened to a first part 38. The force 37 of the actuation element 36 acts upon a second part 39. The actuator 23, which is here itself consisting of two partial actuators arranged in parallel, is provided between the parts 38 and 39. Thus the force applied by the actuator 23 directly is the tension force of the traction rope 32. A transmission does not take place. However, the actuator 23 has to summon up a reaction to the force 37, before it is effective at all.

In all embodiments of the FIGS. 3 to 5, the actuator 23 is kept under pre-stress as it is known that piezoelectric actuators are sensitive to tensile stress but cope well with pressure stress. In the embodiments according to FIGS. 3 and 5, the pressure stress on the actuator 23 results automatically. In the embodiment according to FIG. 4, the actuator 23 can, to this end, somewhat press apart its points of action on the traction rope 32. Advantageously, the actuator shows an inherent pre-stress of its basic piezoelectric or magnetostrictive crystal.

The concrete embodiment of the control means 22 which is adaptive here is known as such. In the simplest case the control means 22 controls the actuator 23 in the sense of a difference controller for the contact force of the collector shoes 1 against the contact wire 2. Adaptivity is given, if the control factors are automatically tuned by the control means to the present operating status of the current collector 15.

While preferred embodiments of the invention have been disclosed herein, it is understood by those skilled in the art that variations and modifications thereof can be made without departing from the spirit and scope of the invention, as set forth in the following claims.

LIST OF REFERENCE NUMERALS

1—collector shoe
2—contact wire
3—lifting device
4—spring-loaded leg
5—rocker
6—axis
7—supporting piece
8—support arm
9—guide bar
10—upper pantograph
11—support arm
12—lower pantograph
13—guide bar
14—extension element
15—current collector
16—arrow
17—axis
18—force sensor
19—acceleration sensor
20—signal
21—signal
22—control means
23—actuator
24—extension
25—extension
26—guideway
27—guideway
28—hook
29—recess
30—region
31—part
32—traction rope
33—guiding piece
34—retaining plate
35—fastening bush
36—actuation element
37—force
38—part of the retaining plate
39—part of the retaining plate

We claim:

1. A current collector for transmitting energy between an energy transmitting contact wire and a motor coach, the current collector comprising at least one collector shoe and a support arm constructed and arranged to lift the collector shoe for applying a contact force between the collector shoe and the contact wire in which the collector shoe lies below and against the contact wire, the support arm being rotatably connected to the motor coach about a horizontal axis and being constructed and arranged to be lifted about said axis by a lifting device, wherein the lifting device has an actuator controlled by a control means, said control means acting in response to a signal emitted by a sensor means positioned on the current collector, the lifting device acting upon the support arm via a traction rope, and wherein the actuator acts upon the traction rope.

2. The current collector according to claim 1, wherein the actuator is a piezoelectric actuator.

3. The current collector according to claim 1, wherein the actuator is arranged in parallel with the traction rope.

4. The current collector according to claim 1, wherein the actuator is positioned perpendicularly with respect to the traction rope at a distance from at least one fixed point of the traction rope.

5. The current collector according to claim 1, wherein the actuator is loaded with pressure by the tensile stress in the traction rope.

6. The current collector according to claim 1, wherein said signal emitted by said sensor means is a measure of the contact force between the collector shoe and the contact wire.

7. The current collector according to claim 1, wherein the actuator is a magnetostrictive actuator.

8. A current collector for transmitting energy between an energy transmitting contact wire and a motor coach, said current collector comprising:

at least one collector shoe;

a support arm constructed and arranged to lift said collector shoe for applying a contact force between the collector shoe and the contact wire in which the collector shoe lies below and against the contact wire;

said support arm being rotatably connected to the motor coach about a horizontal axis and being constructed and arranged to be lifted about said axis by a lifting device;

said lifting device having an actuator controlled by a control means, said control means acting in response to a signal emitted by a sensor means positioned on the current collector, wherein said lifting device acts upon said support arm via a traction rope, and wherein said actuator acts upon said traction rope; and a guideway for said traction rope, the operative radius of the guideway between a tangent line of the traction rope and an axis defining a lever arm of said lifting device in raising the support arm;

wherein said actuator is constructed and arranged to change the operative radius of said guideway.

* * * * *